United States Patent Office 3,594,441
Patented July 20, 1971

3,594,441
PRODUCTION OF HEPTENES
John Grebbell, Send, near Woking, and Kuldar Heljula, Twickenham, England, assignors to The British Petroleum Company Limited, London, England
No Drawing. Filed June 19, 1968, Ser. No. 738,107
Claims priority, application Great Britain, June 22, 1967, 28,801/67
Int. Cl. C07c 3/20
U.S. Cl. 260—683.15      14 Claims

ABSTRACT OF THE DISCLOSURE

Heptenes are produced by codimerising propylene and a butene at an elevated temperature over a catalyst prepared by dispersing sodium and/or lithium on anhydrous potassium carbonate, the catalyst being treated by either (a) incorporating a minor molar proportion of hydrogen in the feed for at least part of the time for which the feed is passed or (b) removing the feed and contacting the catalyst with hydrogen in the absence of the feed at a temperature in the range 50 to 350° C. The catalyst is preferably hydrided before use.

---

This invention relates to improvements in the process described in our British Pat. No. 1,120,515 which describes and claims a process for the production of heptenes which process comprises codimerising propylene and a butene at an elevated temperature over a catalyst prepared by dispersing sodium and/or lithium on an anhydrous potassium compound. Suitable potassium compounds are potassium hydroxide and potassium salts of mineral acids. Suitable potassium salts of mineral acids are the silicate, sulphate and the halides; the preferred salt is potassium carbonate.

It has now been discovered that in the codimerisation of $C_3$ and $C_4$ olefins substantial improvements in the catalyst life and the selectivity to heptenes may be made by (a) incorporating a minor molar proportion of hydrogen in the feed or (b) contacting the catalyst with hydrogen in the absence of the feed.

Thus according to the present invention there is provided a process for the production of heptenes which process comprises codimerising propylene and a butene by passing a feed containing propylene and a butene at an elevated temperature over a catalyst prepared by dispersing sodium and/or lithium on an anhydrous potassium compound, the catalyst being treated by either (a) incorporating a minor molar proportion of hydrogen in the feed for at least part of the time for which the feed is passed or (b) removing the feed and contacting the catalyst with hydrogen in the absence of the feed.

Where the catalyst is treated according to process (b), the temperature is preferably in the range 50–350° C.

The catalyst is preferably either hydrided by pretreatment with hydrogen at a temperature in the range 50 to 350° C. and preferably less than 30 hours after preparation and before use and/or prepared in the presence of hydrogen as claimed in our British Pat. No. 1,143,993.

The catalyst may be prepared by dispersing sodium on the potassium compound in a number of ways including vapour deposition of the metal, deposition in a solution in liquid ammonia with subsequent evaporation of the ammonia, deposition of the metal from a heat decomposable such as sodium hydride or preferably by stirring or tumbling the molten metal with the potassium compound in the presence of hydrogen as disclosed in our British Pat. No. 1,143,993 or an inert gas at temperatures in excess of the M.P. of sodium, e.g. 150–400° C., preferably 200°–350° C., the potassium compound being selected so that it does not melt, sinter or decompose at the deposition temperature.

The preferred catalyst is that comprising 0.5–20% by weight metallic sodium dispersed on anhydrous potassium carbonate. The catalysts more preferably contain 0.5–10 percent by weight of sodium and most preferably 1–5 percent. The potassium carbonate may be in the form of powder, granules (chips or beads) or pellets.

In the case of the process (a) referred to above the hydrogen may be passed with the feed continuously and/or intermittently. If a fixed bed reactor is used then the flow of feed containing hydrogen may be upward or downward or reversed periodically through the catalyst bed. The preferred quantity of hydrogen passed continuously is less than 10 mol percent, more preferably less than 1 mol percent. The preferred conditions will be the same as those for codimerisation as described in our British Pat. 1,120,515 viz the pressure preferably being 800 to 2500 p.s.i.g. more preferably 1400 to 2000 and temperatures preferably being 100 to 200° C. more preferably 120 to 170° C. When the hydrogen is passed intermittently with the feed then the ratio of hydrogen to feed is preferably less than 500 to 1 molar, more preferably less than 200 to 1 molar and the time during which the hydrogen is passed preferably less than 24 hours, more preferably less than 4 hours. The temperature and pressure are preferably the same as those for the codimerisation reaction described in British Pat. 1,120,515.

In the case of process (b) referred to above, the feed is removed from the catalyst bed and the catalyst is treated with hydrogen for times preferably less than 30 hours, preferably as described and claimed in our British Pat. No. 1,066,113 viz at pressures up to 4000 p.s.i.g., and at temperatures preferably in the range 50–350° C.

The process may be carried out either in the presence or absence of a solvent. Normal paraffins are suitable solvents.

The invention is illustrated but not limited by the following Examples 1–5. Example 1 which is not in accordance with the invention is included for comparison purposes only. The reaction conditions and analysis of products are as given in Tables 1 and 2.

TABLE 1

Reaction conditions:
 Catalyst-hydried Na/K₂CO₃,¹ percent wt. Na=4.1
 Temperature, °C.=140° C.
 Pressure, p.s.i.g.=1,000
 Butene:Propylene, molar ratio=2:1
Butene analysis, percent wt.:
 Isobutene=50.5
 Butene-1=5.0
 Butene-2 (cis and trans)=44.5

| | Example | | | | | | | | |
|---|---|---|---|---|---|---|---|---|---|
| | 1 | 2 | | | 3 | | | | |
| | Total Feed LHSV, v./v./hr. | | | | | | | | |
| | 0.6 | 0.6 | | | 1.0 | | | | |
| | | 1st | 2nd | 3rd | 1st | 2nd | 3rd | 4th | |
| Hydrogen treatment: | | | | | | | | | |
| Cumulative time on stream, days | 2 | 2 | 3 | 8 | 14 | 2 | 4 | 6 | 11 | 15 |
| Hydrogen, mol percent | | 10 | 10 | 10 | 10 | | 10 | 100 | 200 | 200 |
| Duration of treatment, h | | 72 | 24 | 24 | | 2 | 2 | 1 | ½ |
| Maximum heptene/hexene yield, g./h./mole Na | 50.5 | 50.8 | 49.1 | 39.6 | 34.2 | 57.0 | 36.0 | 47.5 | 42.0 | 39.7 |
| Mean hexene/heptene analysis, percent wt.: | | | | | | | | | |
| 4MP1 | 34.8 | 31.2 | | | 34.4 | | | | |
| 4MP2 (cis and trans) | 6.9 }45.1 | 7.0 }41.1 | | | 5.2 }42.2 | | | | |
| Other C₆ | 3.4 | 2.9 | | | 2.6 | | | | |
| 3,4-DMP1 | 12.0 | 13.2 | | | 13.8 | | | | |
| 3,4-DMP2 (cis and trans) | 3.2 | 3.4 | | | 3.7 | | | | |
| 2,4-DMP1 | 28.9 | 29.1 | | | 30.0 | | | | |
| 2,4-DMP2 (cis and trans) | 2.5 }54.9 | 1.9 }85.9 | | | 1.1 }57.8 | | | | |
| 5MH2/4MH1 | 1.7 | 1.8 | | | 1.7 | | | | |
| 4,4-DMP1 | 2.5 | 2.4 | | | 2.1 | | | | |
| Other C₇ | 4.1 | 7.1 | | | 5.4 | | | | |
| Overall heptene yield in first 20 days, grams | 1,600 | 3,400 | | | 3,580 | | | | |

¹ Hydrided by treatment with hydrogen at 150° C./1,000 p.s.i.g./17 hours.

Examples 2 and 3 show clearly the benefits obtained by the use of hydrogen. The increased catalyst life and selectivity to heptenes resulted in the yield of heptenes being more than doubled in the 20-day run.

TABLE 2

Examples 4 and 5

Reaction conditions:
 Temperature, °C.=140
 Pressure, p.s.i.g.=1,000
 Total feed LHSV, v./v./h.=1.0
 Butene:propylene, molar ratio=2:1

| | Example | | | | | | | |
|---|---|---|---|---|---|---|---|---|
| | 4 | | | | ² 5 | | | |
| Catalyst-hydrided Na/K₂CO₃,³ percent wt. Na | 3.62 | | | | 4.02 | | | |
| Continuous hydrogen treatment: | | | | | | | | |
| Hydrogen, percent molar | 0.63 | 0 | 0.44 | 0 | 0.33 | 0 | 0.55 | |
| Cumulative time on stream, days | 2-8 | 10 | 10-15 | 16 | 17-23 | 24 | 20 | |
| Maximum heptene/hexene yield, g./h./mole Na | 70.5 | 52.0 | 52.0 | 42.0 | 51.5 | 33.0 | 69.0 | |
| Overall heptene yield in first 20 days, grams | | | 3,000 | | | | 3,560 | |
| Average selectivity to heptenes in hexene/heptene fraction, percent wt | | | 57.0 | | | | 61.0 | |

¹ Butene analysis as in Examples 1, 2 and 3 (Table 1).
² Flow of feed reversed every 2 days.
³ Catalyst hydrided as in Examples 1, 2 and 3 (Table 1).

NOTE.—The above table shows the results obtained using less than 1.0 percent molar hydrogen continuously with the feed.

What we claim is:

1. A process for the production of heptenes which process comprises codimerising propylene and a butene by passing a feed containing propylene and a butene at an elevated temperature over a catalyst prepared by dispersing sodium, lithium or mixtures thereof, on an anhydrous potassium compound, the catalyst being treated by incorporating a minor molar proportion of hydrogen in the feed for at least part of the time for which the feed is passed.

2. A process according to claim 1 wherein the catalyst is hydrided by pretreatment with hydrogen at a temperature in the range of 50 to 350° C. after preparation and before use.

3. A process according to claim 1 wherein the catalyst has been prepared in the presence of hydrogen.

4. A process according to claim 1 wherein the catalyst contains 0.5–20% by weight of metallic sodium dispersed on anhydrous potassium carbonate.

5. A process according to claim 4 wherein the catalyst contains 0.5–10% by weight of sodium.

6. A process according to claim 5 wherein the catalyst contains 1–5% by weight of sodium.

7. A process according to claim 1 wherein the hydrogen is passed continuously with the feed.

8. A process according to claim 7 wherein the hydrogen is passed continuously in an amount of less than 10 mole percent.

9. A process according to claim 8 wherein the hydrogen is passed continuously in an amount of less than 1 mole percent.

10. A process according to claim 1 wherein the pressure is from 1400 to 2000 p.s.i.g. and the temperature for 100 to 200° C.

11. A process according to claim 10 wherein the pressure is from 800 to 2500 p.s.i.g. and the temperature from 120 to 170° C.

12. A process according to claim 1 wherein when the hydrogen is passed intermittently with the feed, the ratio of hydrogen to feed is less than 500 to 1 molar, and the time for which the hydrogen is passed less than 24 hours.

13. A process according to claim 12 wherein the ratio of hydrogen to feed is less than 200 to 1 and the time for which the hydrogen is passed is less than 4 hours.

14. A process according to claim 1 wherein the process is carried out in the presence of a solvent.

References Cited

UNITED STATES PATENTS

| 2,881,234 | 4/1959 | Esmay et al. | 260—683.15 |
| 3,260,770 | 7/1966 | Hambling | 260—683.15 |
| 3,424,814 | 1/1969 | Hambling et al. | 260—683.15 |

PAUL M. COUGHLAN, JR., Primary Examiner

UNITED STATES PATENT OFFICE
CERTIFICATE OF CORRECTION

Patent No. 3,594,441  Dated JULY 20, 1971

Inventor(s) JOHN GREBBELL and KULDAR HELJULA

It is certified that error appears in the above-identified patent and that said Letters Patent are hereby corrected as shown below:

Column 2, line 9, before "such as" insert -- compound --;

Table 1, under "Example 2", "13.2 ) ) : 85.9" should read
$$\begin{matrix} 13.2 \\ \downarrow \\ 7.1 \end{matrix} \Big) : 58.9$$ --;

Table 2, line 6, "Butene:propylene, molar ratio = 2:1" should read -- Butene:propylene$_1$, molar ratio = 2:1 --;

Claim 10, line 2, "1400 to 2000" should read -- 800 to 2500 --; and

Claim 11, line 2, "800 to 2500" should read -- 1400 to 2000 --.

Signed and sealed this 8th day of February 1972.

(SEAL)
Attest:

EDWARD M. FLETCHER, JR.  
Attesting Officer

ROBERT GOTTSCHALK  
Commissioner of Patents